(12) United States Patent
Kato et al.

(10) Patent No.: US 10,010,871 B2
(45) Date of Patent: Jul. 3, 2018

(54) CARRIER FOR EXHAUST GAS PURIFICATION CATALYST AND EXHAUST GAS PURIFICATION CATALYST

(71) Applicant: Mitsui Mining & Smelting Co., Ltd., Tokyo (JP)

(72) Inventors: Sumio Kato, Akita (JP); Masataka Ogasawara, Akita (JP); Hironori Iwakura, Saitama (JP); Takahito Asanuma, Saitama (JP); Takashi Wakabayashi, Saitama (JP); Yunosuke Nakahara, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 15/504,760

(22) PCT Filed: Dec. 14, 2015

(86) PCT No.: PCT/JP2015/084938
§ 371 (c)(1),
(2) Date: Feb. 17, 2017

(87) PCT Pub. No.: WO2016/117240
PCT Pub. Date: Jul. 28, 2016

(65) Prior Publication Data
US 2017/0274359 A1  Sep. 28, 2017

(30) Foreign Application Priority Data

Jan. 19, 2015 (JP) ................................. 2015-008015
Oct. 9, 2015 (JP) ................................. 2015-200921

(51) Int. Cl.
| | | |
|---|---|---|
| *B01J 23/04* | (2006.01) | |
| *B01J 23/44* | (2006.01) | |
| *B01D 53/94* | (2006.01) | |
| *B01J 37/08* | (2006.01) | |
| *B01J 37/02* | (2006.01) | |
| *B01J 23/42* | (2006.01) | |
| *B01J 23/02* | (2006.01) | |
| *B01J 27/18* | (2006.01) | |

(52) U.S. Cl.
CPC ............ *B01J 23/44* (2013.01); *B01D 53/944* (2013.01); *B01D 53/945* (2013.01); *B01J 23/02* (2013.01); *B01J 23/42* (2013.01); *B01J 27/1806* (2013.01); *B01J 37/0236* (2013.01); *B01J 37/08* (2013.01); *B01D 2255/1021* (2013.01); *B01D 2255/1023* (2013.01); *B01D 2255/204* (2013.01); *B01D 2255/2022* (2013.01); *B01D 2255/2042* (2013.01); *B01D 2255/2045* (2013.01); *B01D 2255/2047* (2013.01); *B01D 2255/30* (2013.01); *B01D 2255/70* (2013.01)

(58) Field of Classification Search
CPC ........ B01J 23/02; B01J 23/04; B01J 27/1806; B01D 2255/202; B01D 2255/204; B01D 2255/30
USPC .......................................... 502/208, 243, 250
See application file for complete search history.

(56) References Cited

U.S. PATENT DOCUMENTS

| | | | | |
|---|---|---|---|---|
| 3,227,659 A * | 1/1966 | Brandenburg | ..... | B01D 53/8671 422/177 |
| 3,459,494 A * | 8/1969 | Harris | ................ | B01D 53/9413 423/239.1 |
| 3,915,896 A * | 10/1975 | Oliver | ................... | B01D 53/944 502/250 |
| 4,186,109 A * | 1/1980 | Atsukawa | .......... | B01D 53/9418 423/213.2 |
| 4,224,292 A * | 9/1980 | Uchida | .............. | B01D 53/8637 423/239.1 |
| 8,986,642 B2 | 3/2015 | Siegel et al. | | |
| 2009/0131249 A1 | 5/2009 | Takeshima et al. | | |
| 2012/0010379 A1 | 1/2012 | Siegel et al. | | |
| 2013/0165608 A1 | 6/2013 | Siegel et al. | | |
| 2014/0051894 A1* | 2/2014 | Weiner | .................. | C07C 29/149 568/885 |
| 2015/0133292 A1 | 5/2015 | Nakata et al. | | |

FOREIGN PATENT DOCUMENTS

| | | | | | |
|---|---|---|---|---|---|
| JP | 53090188 A | * | 8/1978 | ............. | B01J 23/02 |
| JP | 06-055075 | * | 3/1994 | ............. | B01J 27/14 |
| JP | 6-218282 | | 8/1994 | | |
| JP | 7-144134 | | 6/1995 | | |
| JP | 11-114377 | | 4/1999 | | |
| JP | 11-267509 | | 10/1999 | | |
| JP | 2000-157865 | | 6/2000 | | |
| JP | 2004-216223 | | 8/2004 | | |
| JP | 2007-144393 | | 6/2007 | | |
| JP | 2007-144412 | | 6/2007 | | |
| JP | 2011-208556 | | 10/2011 | | |
| JP | 2012-520236 | | 9/2012 | | |

(Continued)

OTHER PUBLICATIONS

International Search Report of PCT/JP2015/084938 dated Feb. 16, 2016.

*Primary Examiner* — Patricia L. Hailey
(74) *Attorney, Agent, or Firm* — Rankin, Hill & Clark LLP

(57) ABSTRACT

Provide is a new carrier for exhaust gas purification catalyst which exhibits excellent catalytic activity, particularly catalytic activity at a low temperature. Proposed is a carrier for exhaust gas purification catalyst composed of particles which contain a silicate or phosphate containing one kind or two or more kinds among the elements belonging to Group 1 and Group 2 in the periodic table.

7 Claims, No Drawings

(56) References Cited

FOREIGN PATENT DOCUMENTS

| JP | 2013-6170 | 1/2013 |
|---|---|---|
| JP | 2013-244469 | 12/2013 |
| JP | 2013-252465 | 12/2013 |

* cited by examiner

1

CARRIER FOR EXHAUST GAS PURIFICATION CATALYST AND EXHAUST GAS PURIFICATION CATALYST

TECHNICAL FIELD

The present invention relates to an exhaust gas purification catalyst which can be used for purifying exhaust gas discharged from internal combustion engines such as a gasoline engine of a two-wheeled or four-wheeled vehicle and a diesel engine and a carrier for exhaust gas purification catalyst to be used therein.

BACKGROUND ART

The exhaust gas discharged from a vehicle using gasoline as fuel contains harmful components such as hydrocarbons (THC), carbon monoxide (CO), and nitrogen oxides (NOx). Hence, it is required to purify each of the harmful components so as to convert the hydrocarbons (THC) into water and carbon dioxide through oxidation, carbon monoxide (CO) into carbon dioxide through oxidation, and the nitrogen oxides (NOx) into nitrogen through reduction.

As the catalyst (hereinafter, referred to as the "exhaust gas purification catalyst") for treating such exhaust gas, a three way catalyst (TWC) which is able to oxidize or reduce CO, THC, and NOx is used.

As such a three way catalyst, one that is obtained by supporting a precious metal on an oxide porous material having a high specific surface area, for example, an alumina porous material having a high specific surface area and supporting this on a substrate, for example, a monolithic substrate having a refractory ceramic or metallic honeycomb structure or on refractory particles is known.

Meanwhile, the exhaust gas discharged from a diesel engine contains sulfates derived from the sulfur component in the fuel and tar-like fine particulate materials (referred to as "PM") due to incomplete combustion, and the like in addition to CO, THC, and NOx described above.

As a device for removing CO and THC contained in the exhaust gas discharged from a diesel engine, a diesel oxidation catalyst (referred to as "DOC") is known.

As DOC, one that is obtained by coating a refractory inorganic porous material such as zeolite or $Al_2O_3$ on a porous filter substrate having a honeycomb structure is known.

A precious metal such as platinum (Pt), palladium (Pd), or rhodium (Rh) has been often used in both of the catalysts that are a catalyst for purifying the exhaust gas discharged from a gasoline engine and a catalyst for purifying the exhaust gas discharged from a diesel engine as a catalytically active component. Moreover, the bonding strength between these precious metals as a catalytically active component and the substrate is not so strong and the specific surface area of the substrate itself is not also so great, and it is thus difficult to support the precious metal on the substrate in a sufficient supporting amount and a highly dispersed manner even when it is attempted to directly support the precious metal on the substrate. Hence, it is conducted to support a precious metal on a particulate catalyst carrier having a high specific surface area in order to support a sufficient amount of a catalytically active component on the surface of a substrate in a highly dispersed manner.

As this kind of carrier for exhaust gas purification catalyst (also referred to as the "catalyst carrier" or "carrier"), porous particles composed of refractory inorganic oxides such as silica, alumina, and titania compounds are known. Among them, a catalyst obtained by supporting a precious metal on an inorganic porous material such as alumina having a high specific surface area in a highly dispersed manner has been hitherto widely used from the viewpoint of excellent purification performance at a low temperature.

With regard to the catalyst carrier, for example, a heat resistant catalyst carrier which is composed substantially of alumina and has a coating layer of one or more kinds of oxides selected from $SiO_2$, CaO, SrO, BaO, and $La_2O_3$ is disclosed in Patent Document 1 (JP 6-218282 A (Kurosaki Fire-Brick Manufacturing Company Limited)).

A composite oxide carrier which contains $TiO_2$—$Al_2O_3$ as a main component and Si and is characterized in that Si constitutes a composite oxide with at least either of $TiO_2$ or $Al_2O_3$ is disclosed in Patent Document 2 (JP 2000-157865 A (TOYOTA MOTOR CORPORATION)).

A catalyst carrier for supporting a precious metal, which is composed of a composite oxide of an electron accepting element with other elements and in which the electronic accepting element is selected from the group consisting of lanthanum, neodymium, yttrium, magnesium, and any combination thereof, the other elements are selected from the group consisting of silicon, aluminum, zirconium, titanium, and any combination thereof, and the molar ratio of the electron accepting element to the sum of the electron accepting element and the other elements is 0.3 or more is disclosed in Patent Document 3 (JP 2007-144393 A (TOYOTA MOTOR CORPORATION)).

Spherical beads which has an average diameter in a range of from 10 to 120 μm, a BET surface area in a range of from 400 to 800 m$^2$/g, and a pore volume in a range of from 0.3 to 3.0 cm$^3$/g and contains a metal and/or a metalloid oxide selected from the group consisting of $SiO_2$ or $Al_2O_3$, $TiO_2$, MgO, and any mixture thereof is disclosed in Patent Document 4 (JP 2012-520236 W (BASF SE)) as the beads which can be utilized as a catalyst carrier.

A catalyst carrier for exhaust gas purification that is characterized by containing a phosphate represented by a general formula $MPO_4$ (in the formula, M is Y, La, or Al) or zirconium phosphate represented by a formula $ZrP_2O_7$ is disclosed in Patent Document 5 (JP 2013-252465 A (MITSUI MINING & SMELTING CO., LTD.)) as a catalyst carrier for exhaust gas purification which can significantly improve the performance as compared to Rh-supporting zirconia while suppressing a decrease in $NO_x$ purification activity in a lean region in which the excess air ratio λ is greater than 1.

CITATION LIST

Patent Document

Patent Document 1: JP 6-218282 A
Patent Document 2: JP 2000-157865 A
Patent Document 3: JP 2007-144393 A
Patent Document 4: JP 2012-520236 W
Patent Document 5: JP 2013-252465 A

SUMMARY OF THE INVENTION

Problem to be Solved by the Invention

As described above, alumina that is widely used as a catalyst carrier has a great specific surface area, and thus can support a precious metal in a highly dispersed state and make a reaction field so as to exhibit excellent purification performance at a low temperature. However, on the other hand, it has a problem that the alumina carrier itself aggregates or is sintered while being exposed to heat at the time of use, thus the specific surface area thereof gradually decreases and the precious metal aggregates at the same time, and the catalytic activity, particularly low-temperature catalytic activity decreases as a result.

Accordingly, an object of the invention is to provide a new carrier for exhaust gas purification catalyst which exhibits superior catalytic activity, particularly catalytic purification performance at a low temperature as compared to an alumina carrier that has been used in the prior art.

Means for Solving Problem

The invention proposes a carrier for exhaust gas purification catalyst composed of particles which contain a silicate or phosphate containing one kind or two or more kinds among the elements belonging to Group 1 and Group 2 in the periodic table. For example, a carrier for exhaust gas purification catalyst composed of particles which contain a silicate containing Ca, Sr, or Ba or two or more kinds among these is proposed.

Effect of the Invention

The carrier for exhaust gas purification catalyst proposed by the invention can exert superior low-temperature activity (particularly, propylene activating ability or oxygen activating ability) as compared to an $Al_2O_3$ carrier having a high specific surface area although it has a lower surface area when being allowed to coexist with a catalytically active component such as a precious metal by increasing the promoter activity thereof for the exhaust gas purification reaction. Furthermore, it is also possible to achieve the improvement in NOx conversion ratio at a high temperature.

Consequently, the carrier for exhaust gas purification catalyst proposed by the invention is useful as a carrier for diesel oxidation catalyst. In addition, it is also useful as a carrier for gasoline three way catalyst since it exhibits excellent low-temperature activity even in the NO—$C_3H_6$—$O_2$ system that is a reaction system of a three way catalyst.

MODE(S) FOR CARRYING OUT THE INVENTION

Next, the invention will be described with reference to examples of the embodiments. However, the invention is not limited to the embodiments to be described below.

<Present Catalyst>

The exhaust gas purification catalyst (hereinafter, referred to as the "present catalyst") as an example of embodiments of the invention is a composition containing a catalyst carrier (hereinafter, referred to as the "present catalyst carrier") and a catalytically active component to be supported on the catalyst carrier, and it can contain a promoter such as an OSC material, a stabilizer, and other components if necessary.

<Present Catalyst Carrier>

The present catalyst carrier is a carrier for exhaust gas purification catalyst composed of particles which contain a silicate or phosphate containing one kind or two or more kinds among the elements belonging to Group 1 and Group 2 in the periodic table.

Incidentally, in the present catalyst carrier, the silicate or phosphate may contain other components other than both of them as long as the action of the silicate or phosphate is not interfered. However, in the present catalyst carrier, the silicate or phosphate contains both of them preferably at 30 mass % or more, more preferably at 50 mass % or more among them, and even more preferably at 95 mass % or more among them.

Examples of the "silicate or phosphate containing one kind or two or more kinds among the elements belonging to Group 1 and Group 2 in the periodic table" may include a silicate or phosphate containing one kind or two or more kinds among Li, Na, K, Rb, Cs, and Fr belonging to Group 1 in the periodic table and Be, Mg, Ca, Sr, Ba, and Ra belonging to Group 2 in the periodic table.

As the "silicate", a silicate which contains Ca, Sr, or Ba or two or more kinds among these is preferable.

Specific example of the silicate may include $A_2SiO_4$ (A is Ca, Sr, or Ba or elements including two or more kinds among these), $ASiO_3$ (A is Ca, Sr, or Ba or elements including two or more kinds among these), or a mixture of these.

At this time, in $A_2SiO_4$ and $ASiO_3$, A may contain other elements, for example, a divalent metal element such as Mg as long as it contains any of Ca, Sr, or Ba.

Among these, one that contains a single phase of $A_2SiO_4$ (A is Ca, Sr, or Ba or elements including two or more kinds among these) or $ASiO_3$ (A is Ca, Sr, or Ba or elements including two or more kinds among these) is preferable from the viewpoint of the durability and catalytic activity at a low temperature, and among them, one that contains a single phase of $A_2SiO_4$ (A is Ca, Sr, or Ba or elements including two or more kinds among these) is even more preferable from the viewpoint of the durability and catalytic activity at a low temperature.

$A_2SiO_4$ (A is Ca, Sr, or Ba or elements including two or more kinds among these) described above includes $A_2SiO_4$ (A is Ca, Sr, or Ba or two or more kinds of elements among these), $A_2SiO_4$ (A is Ca, Sr, or Ba or a combination of two or more kinds of elements among these with a divalent metal element such as Mg), and the like.

Specific examples thereof may include $Ca_2SiO_4$, $Sr_2SiO_4$, $Ba_2SiO_4$, $(Ca_{1-x}Sr_x)_2SiO_4$, $(Ca_{1-x}Ba_x)_2SiO_4$, $(Sr_{1-x}Ba_x)_2SiO_4$, $(Ca_{1-x}Mg_x)_2SiO_4$, $(Sr_{1-x}Mg_x)_2SiO_4$, and a composition containing a divalent metal element instead of Mg. Incidentally, in the above formulas, x is a numerical value from 0 to 1.

$ASiO_3$ (A is Ca, Sr, or Ba or elements including two or more kinds among these) described above includes $ASiO_3$ (A is Ca, Sr, or Ba or two or more kinds of elements among these) and $ASiO_3$ (A is Ca, Sr, or Ba or a combination of two or more kinds of elements among these with a divalent metal element such as Mg), and the like.

Specific examples thereof may include $CaSiO_3$, $SrSiO_3$, $BaSiO_3$, $(Ca_{1-x}Sr_x)SiO_3$, $(Ca_{1-x}Ba_x)SiO_3$, $(Sr_{1-x}Ba_x)SiO_3$, $(Ca_{1-x}Mg_x)SiO_3$, $(Sr_{1-x}Mg_x)SiO_3$, and a composition containing a divalent metal element instead of Mg. Incidentally, in the above formulas, x is a numerical value from 0 to 1.

$A_2SiO_4$ has an independent $SiO_4$ tetrahedron and a feature that the content of the alkaline earth metal is high.

The present catalyst carrier is preferably a carrier for exhaust gas purification catalyst composed of particles which contain a silicate containing Ba or Ba and Sr among the silicates described above from the viewpoint of the durability and catalytic activity at a low temperature. In addition, the silicate is preferably one that does not substantially contain a rare earth element. Incidentally, the term "substantially" means to be acceptable in a case in which a rare earth element is contained as unavoidable impurities.

Here, preferred examples of the silicate containing Ba may include $Ba_2SiO_4$, $BaSiO_3$, or a mixture of these. In addition, preferred examples of the silicate containing Ba and Sr may include $(Ba_{1-x}Sr_x)_2SiO_4$, $(Ba_{1-x}Srx)SiO_3$, or a mixture of these.

Incidentally, it is acceptable that the silicate contains an element other than the elements already described to the extent to which the effect of the invention is not impaired.

Meanwhile, as the "phosphate", a phosphate which contains Ca, Sr, or Ba or two or more kinds among these is preferable.

Specific examples of the phosphate may include a phosphate which can be represented by $A_xPO_4$ (x=2 or 1.5, A in the case of x=2 is a combination of any one kind of monovalent element or two or more kinds of monovalent elements among Li, Na, K, and Cs with any one kind of divalent element or two or more kinds of divalent elements among Mg, Ca, Sr, and Ba, A in the case of x=1.5 is any one kind of divalent element or two or more kinds of divalent elements among Mg, Ca, Sr, and Ba).

In addition, the present catalyst carrier is preferably a carrier for exhaust gas purification catalyst composed of particles which contain a phosphate containing Ba or Ba and Sr among the phosphates described above from the viewpoint of the durability and catalytic activity at a low temperature. In addition, the phosphate is preferably one that does not substantially contain a rare earth element. Incidentally, the term "substantially" means to be acceptable in a case in which a rare earth element is contained as unavoidable impurities.

Here, preferred examples of the phosphate containing Ba may include $Ba_{1.5}PO_4$ and $KBaPO_4$.

In addition, preferred examples of the phosphate containing Ba and Sr may include $(Ba_{1-x}Sr_x)_{1.5}PO_4$ (provided that 0<x<1), $K(Ba_{1-x}Sr_x)PO_4$ (provided that 0<x<1).

Incidentally, it is acceptable that the phosphate contains an element other than the elements already described to the extent to which the effect of the invention is not impaired.

The particles of the present catalyst carrier are preferably a porous material from the viewpoint of increasing the specific surface area, and thus the specific surface area of the catalyst carrier is preferably $0.1 m^2/g$ or more, and in reality, it is preferably $1.0 m^2/g$ or more, and it is even more preferably $1.5 m^2/g$ or more among them.

Incidentally, the upper limit of the specific surface area of the present catalyst carrier is not particularly limited. The specific surface area of the present catalyst carrier may be $100 m^2/g$ or less, it is preferably $50 m^2/g$ or less among them, and it is even more preferably $10 m^2/g$ or less among them from the results of Examples and the results of the tests which the inventors have so far carried out.

(Method for Producing Present Catalyst Carrier)

An example of the method for producing the present catalyst carrier will be described. However, the method for producing the present catalyst carrier is not limited to an example to be described below.

For example, a carbonate or acetate of the elements belonging to Group 1 and Group 2 in the periodic table and silicon oxide ($SiO_2$) or a phosphate (($NH_4)_2HPO_4$, $NH_4H_2PO_4$) are introduced into deionized water or an organic solvent such as ethanol and wet-mixed by stirring, and the solution thus obtained is then dried by holding for about from 40 minutes to 15 hours, for example, at from 100 to 120° C. in the case of deionized water (product temperature) and at from 50 to 100° C. in the case of an organic solvent, respectively, and calcined, whereby the catalyst carrier can be obtained. However, the method for producing the present catalyst carrier is not limited to an example to be described below.

At this time, for example, in the case of a carrier for exhaust gas purification catalyst composed of particles which contain a silicate containing Ca, Sr, or Ba or two or more kinds among these, a carbonate of the elements belonging to Group 2 ($ACO_3$ (A is Ca, Sr, or Ba or elements including two or more kinds among these) and silicon oxide ($SiO_2$) are introduced into deionized water or an organic solvent such as ethanol and wet-mixed by stirring, and the solution thus obtained is then dried by holding for about from 40 minutes to 15 hours, for example, at from 100 to 120° C. in the case of deionized water (product temperature) and at from 50 to 100° C. in the case of an organic solvent, respectively, and calcined, whereby the catalyst carrier can be obtained. However, the method for producing the present catalyst carrier is not limited to an example to be described below.

Meanwhile, in the case of a carrier for exhaust gas purification catalyst composed of particles which contain a phosphate containing Ca, Sr, or Ba or two or more kinds among these, a carbonate ($ACO_3$ (A is Ca, Sr, or Ba or elements including two or more kinds among these) or an acetate of the elements belonging to Group 2 and a dihydrogen phosphate of the elements belonging to Group 1 ($LiH_2PO_4$, $NaH_2PO_4$, $KH_2PO_4$) are introduced into pure deionized water or an organic solvent such as ethanol and wet-mixed by stirring, and the solution thus obtained is then dried by holding for about from 40 minutes to 15 hours, for example, at from 100 to 120° C. in the case of deionized water (product temperature) and at from 50 to 100° C. in the case of an organic solvent, respectively, and calcined, whereby the catalyst carrier can be obtained. However, the method for producing the present catalyst carrier is not limited to an example to be described below.

Examples of the calcination atmosphere may include an air atmosphere, an oxygen atmosphere, and an inert gas atmosphere, and among them, an air atmosphere is preferable from the viewpoint of mass productivity.

The calcination temperature may be from 500 to 1500° C., and it is even more preferably 700° C. or higher or 1400° C. or lower among them.

Incidentally, when the present catalyst carrier is sintered at a high temperature of about 1300° C., the specific surface area decreases as compared to a case in which the present catalyst carrier is calcined at a lower temperature although it is possible to even further improve the crystallinity.

The calcination time may be set appropriately depending on the calcination temperature. As a guideline, it is preferably set to from 10 to 20 hours.

<Another Catalyst Carrier>

The present catalyst may contain other inorganic porous particles as a catalyst carrier in addition to the present catalyst carrier.

Examples of the other inorganic porous particles may include porous particles of a compound selected from the group consisting of silica, alumina, and titania compounds, and more specifically, porous particles composed of a compound selected from alumina, silica, silica-alumina, alumino-silicate, alumina-zirconia, alumina-chromia, and alumina-ceria.

As other inorganic porous particles, for example, an OSC material, namely, a promoter having an oxygen storage capacity (OSC) may be contained.

Examples of the OSC material may include a cerium compound, a zirconium compound, and a ceria and zirconia composite oxide.

<Catalytically Active Component>

Examples of the catalytically active component contained in the present catalyst, namely, a metal exhibiting catalytic activity may include a metal such as palladium, platinum, rhodium, gold, silver, ruthenium, iridium, nickel, cerium, cobalt, copper, iron, manganese, osmium, or strontium. In addition, an oxide of these can also be preferably employed.

Among them, it is even more preferable to contain platinum or palladium or both of them as a catalytically active component from the viewpoint of even further enjoying the effect of the present catalyst.

In particular, platinum exhibiting higher S poisoning resistance than palladium is more suitable for the application to a diesel engine which discharges a sulfur component of a poisoning substance derived from the fuel in a more amount, and palladium is more suitable than platinum for the application to a gasoline engine which discharges a sulfur component in a less amount in consideration of S poisoning resistance and cost.

The amount of the catalytically active component supported in the present catalyst is preferably 5.0 mass % or less in terms of the metal mass of the active component based on the mass of the carrier, and it is more preferably 0.1 mass % or more among them, and it is even more preferably 0.5 mass % or more or 3.0 mass % or less among them in particular.

Incidentally, the present catalyst carrier itself has the propylene activating ability, and thus it is expected to obtain the exhaust gas purifying effect by only mixing the present catalyst carrier with a catalytically active component even without supporting a precious metal. Furthermore, it is possible to obtain a superior exhaust gas purifying effect as the present catalyst carrier supports a precious metal.

<Stabilizer and Other Components>

The present catalyst can contain a stabilizer, a binder, and other components.

Examples of the stabilizer may include an alkaline earth metal, an alkali metal, or a lanthanide metal. Among them, it is possible to select one kind or two or more kinds among the metals selected from the group consisting of magnesium, barium, boron, thorium, hafnium, silicon, calcium, lanthanum, neodymium, and strontium.

In addition, the present catalyst may contain a known additive component such a binder component.

As the binder component, an inorganic binder, for example, a water-soluble solution such as alumina sol can be used.

<Method for Producing Present Catalyst>

Next, an example of a method for producing the present catalyst will be described. However, the method for producing the present catalyst is not limited to an example to be described below.

The present catalyst can be produced, for example, by mixing the present catalyst carrier, a catalytically active component, for example, a precious metal compound, and other components, drying the mixture through heating, and then calcining the dry mixture.

Examples of the solution of a precious metal compound may include a nitrate, a chloride, and a sulfate of a precious metal.

Examples of the other components may include a promoter such as an OSC material, a stabilizer, and a binder.

<Present Catalyst Structure>

It is possible to fabricate a catalyst structure for exhaust gas purification (referred to as the "present catalyst structure") equipped with a catalyst layer composed of the present catalyst and, for example, a substrate composed of a ceramic or a metal material.

The catalyst layer may be, for example, one that has a configuration in which a catalyst layer is formed on the surface of a substrate, one that has a configuration in which a catalyst layer is formed on the surface of a substrate via another layer, or one that has a configuration in which a catalyst layer is formed on a place other than the surface side of a substrate.

In any production method, the catalyst layer may be a single layer or a multilayer consisting of two or more layers.

(Substrate)

As the substrate of the present catalyst structure, a presently known substrate can be widely employed.

Examples of the material for the substrate may include a refractory material such as a ceramic or a metal material.

Examples of the material for the ceramic substrate may include a refractory ceramic material, for example, cordierite, cordierite-alpha alumina, silicon carbide (SiC), silicon nitride, mullite, alumina, aluminum titanate, zircon mullite, spodumene, alumina-silica magnesia, zircon silicate, sillimanite, magnesium silicate, zircon, petalite, alpha alumina, and an aluminosilicate.

Examples of the material for the metal substrate may include a refractory metal, for example, other suitable corrosion resistant alloys containing stainless steel or iron as the base, for example, a refractory metal, for example, an Fe—Cr—Al alloy.

The shape of the substrate is not particularly limited. In general, it is a shape such as a honeycomb, a plate, or a pellet, and it is preferably a honeycomb shape.

In addition, it may be a shape which is mainly used in a particulate filter. Examples thereof may include a wall-through type, a flow-through honeycomb type, a wire mesh type, a ceramic fiber type, a metal porous material type, a particle-filled type, and a foam type.

In the case of using a substrate having a honeycomb shape, for example, it is possible to use a monolithic substrate having a great number of fine gas flow passages, namely, channels parallel to the inside of the substrate so that a fluid flows through the inside of the substrate. At this time, it is possible to form a catalyst layer by coating the present catalyst on the inner wall surface of each channel of the monolithic substrate.

(Method for Producing Present Catalyst Structure)

As a method for producing the present catalyst structure, for example, the present catalyst carrier, a catalytically active component, for example, a precious metal, and an OSC material, a binder, and water if necessary are mixed together and stirred to be formed into a slurry, the slurry thus obtained is coated, for example, on a substrate such as a ceramic honeycomb material, and this is calcined to form a catalyst layer on the substrate surface, whereby the present catalyst structure can be fabricated.

In addition, the present catalyst carrier and an OSC material, a binder, and water if necessary are mixed together and stirred to be formed into a slurry, the slurry thus obtained is coated, for example, on a substrate such as a ceramic honeycomb material, this is immersed in a solution of a catalytically active component to adsorb the catalytically active component onto the catalyst carrier layer, and this is calcined to form a catalyst layer on the substrate surface, whereby the present catalyst structure can be fabricated.

In addition, a catalytically active component support obtained by supporting a catalytically active component on an oxide, the present catalyst carrier and an OSC material, a binder, and water if necessary are mixed together and stirred to be formed into a slurry, this is coated, for example, on a substrate, and this is calcined to form a catalyst layer on the substrate surface, whereby the present catalyst structure can be fabricated.

Incidentally, it is possible to employ any known method as the method for producing the present catalyst, and the method is not limited to the examples described above.

<Description of Phrase>

In the present specification, in a case in which it is expressed to be "X to Y" (X and Y are arbitrary numbers), it also includes the meaning to be "preferably greater than X" or "preferably smaller than Y" together with the meaning to be "X or more and Y or less" unless otherwise stated.

In addition, in a case in which it is expressed to be "X or more" (X is an arbitrary number) or "Y or less" (Y is an arbitrary number), it also includes the intention to be "preferably greater than X" or "preferably less than Y".

EXAMPLES

Hereinafter, the invention will be described in more detail with reference to Examples and Comparative Examples.

Comparative Example 1

A commercially available alumina powder (specific surface area: 159.6 m$^2$/g) was introduced into an aqueous solution of $Pt(NH_3)_2(NO_2)_2$ and stirred for 2 hours to impregnate the catalyst carrier with Pt, and then evaporated to dryness, and subsequently held for 3 hours at 600° C. in the air, thereby obtaining a precious metal-supporting catalyst (sample).

The amount of precious metal supported in the precious metal-supporting catalyst (sample) thus obtained was 1 mass %.

Example 1

Ba carbonate ($BaCO_3$) and silicon oxide ($SiO_2$) were mixed together at a proportion of 2:1 in a molar ratio, and the mixture was introduced into ethanol, wet-mixed by stirring for 24 hours, then dried by holding for 12 hours at 60° C. (product temperature), and then calcined for 36 hours at 1350° C. in the air, thereby obtaining a catalyst carrier.

The catalyst carrier obtained in this manner had a specific surface area of 0.4 m$^2$/g and a peak indicating the single phase of $Ba_2SiO_4$ was confirmed as a result of the analysis thereof by an X-ray diffraction (XRD) method.

The catalyst carrier ($Ba_2SiO_4$) obtained in this manner was introduced into an aqueous solution of $Pt(NH_3)_2(NO_2)_2$ and stirred for 2 hours to impregnate the catalyst carrier with Pt, and then dried by holding the resultant for one hour at 600° C. (product temperature), and subsequently held for 3 hours at 600° C. in the air, thereby obtaining a precious metal-supporting catalyst (sample).

The amount of precious metal supported in the precious metal-supporting catalyst (sample) thus obtained was 1 mass %.

<$C_3H_6$—$O_2$ Reaction (Light-Off Test)>

As a pre-treatment of the test for $C_3H_6$ oxidation activity evaluation test, a gas of 1.5% $O_2$/He (600° C.) was allowed to flow over 0.1 g of the precious metal-supporting catalyst (sample) at a gas flow rate of 500 cm$^3$/min for 10 minutes, thereby conducting the pre-treatment.

The purification performance of the respective precious metal-supporting catalysts (samples) obtained in Comparative Example 1 and Example 1 by a simulated exhaust gas was evaluated by using a fixed bed flow type reactor.

In other words, 0.1 g of each of the precious metal-supporting catalysts (samples) was set in the reaction tube such that quartz wool was respectively packed in front of and behind the precious metal-supporting catalyst (sample) as well as quartz wool was respectively packed in front of and behind the catalyst so as to sandwich the catalyst.

Thereafter, a simulated exhaust gas having a composition consisting of $C_3H_6$ at 1500 ppm, $O_2$ at 9000 ppm, and He as the balance was introduced into the reaction tube at a total flow rate of 500 cm$^3$/min after the pre-treatment, the temperature was continuously raised from 100° C. to 600° C. at 10° C./min, and the exhaust gas at the outlet of the reaction tube was analyzed by using a quadrupole mass spectrometer to determine the component composition in the reaction gas.

(Results)

It was possible to confirm that the catalyst carrier of Example 1 exerts superior propylene activating ability or oxygen activating ability even though it has a significantly smaller specific surface area as compared to the catalyst carrier of Comparative Example 1. Among them, it was possible to confirm that the catalyst carrier of Example 1 exhibits excellent propylene activating ability or oxygen activation ability at a low temperature.

Example 2

Ca carbonate ($CaCO_3$) and silicon oxide ($SiO_2$) were mixed together at a proportion of 2:1 in a molar ratio, and the mixture was introduced into deionized water, wet-mixed by stirring for 24 hours, then dried by holding for 12 hours at 120° C. (product temperature), and then calcined for 24 hours at 1350° C. in the air, thereby obtaining a catalyst carrier.

The catalyst carrier obtained in this manner had a specific surface area of 8.8 m$^2$/g and a peak indicating the single phase of $Ca_2SiO_4$ was confirmed as a result of the analysis thereof by an X-ray diffraction (XRD) method.

The catalyst carrier ($Ca_2SiO_4$) obtained in this manner was introduced into an aqueous solution of $Pt(NH_3)_2(NO_2)_2$ and stirred for 2 hours to impregnate the catalyst carrier with Pt, and then evaporated to dryness, and subsequently held for 3 hours at 600° C. in the air, thereby obtaining a precious metal-supporting catalyst (sample).

The amount of precious metal supported in the precious metal-supporting catalyst (sample) thus obtained was 1 mass %.

Example 3

A catalyst carrier and a precious metal-supporting catalyst (sample) were obtained in the same manner as in Example 2 except that Ca carbonate was changed to Sr carbonate in Example 2.

Incidentally, the catalyst carrier obtained in this manner had a specific surface area of 9.6 m$^2$/g and a peak indicating the single phase of $Sr_2SiO_4$ was confirmed as a result of the analysis thereof by an X-ray diffraction (XRD) method.

Example 4

A catalyst carrier and a precious metal-supporting catalyst (sample) were obtained in the same manner as in Example 2 except that Ca carbonate ($CaCO_3$), Sr carbonate ($SrCO_3$), and silicon oxide ($SiO_2$) were mixed together at a proportion of 1:1:1 in a molar ratio instead of mixing Ca carbonate (CaCO$_3$) and silicon oxide (SiO$_2$) together at a proportion of 2:1 in a molar ratio in Example 2.

Incidentally, the catalyst carrier obtained in this manner had a specific surface area of 1.9 m$^2$/g and a peak indicating the single phase of (Sr$_{0.5}$Ca$_{0.5}$)$_2$SiO$_4$ was confirmed as a result of the analysis thereof by an X-ray diffraction (XRD) method.

Example 5

A catalyst carrier and a precious metal-supporting catalyst (sample) were obtained in the same manner as in Example 2 except that Sr carbonate (SrCO$_3$), Mg carbonate (MgCO$_3$), and silicon oxide (SiO$_2$) were mixed together at a proportion of 1:1:1 in a molar ratio instead of mixing Ca carbonate (CaCO$_3$) and silicon oxide (SiO$_2$) together at a proportion of 2:1 in a molar ratio in Example 2.

Incidentally, the catalyst carrier obtained in this manner had a specific surface area of 3.1 m$^2$/g and a peak indicating the single phase of (Sr$_{0.5}$Mg$_{0.5}$)$_2$SiO$_4$ was confirmed as a result of the analysis thereof by an X-ray diffraction (XRD) method.

Example 6

A catalyst carrier and a precious metal-supporting catalyst (sample) were obtained in the same manner as in Example 2 except that Ca carbonate (CaCO$_3$), Mg carbonate (MgCO$_3$), and silicon oxide (SiO$_2$) were mixed together at a proportion of 1:1:1 in a molar ratio instead of mixing Ca carbonate (CaCO$_3$) and silicon oxide (SiO$_2$) together at a proportion of 2:1 in a molar ratio in Example 2.

Incidentally, the catalyst carrier obtained in this manner had a specific surface area of 2.2 m$^2$/g and a peak indicating the single phase of (Ca$_{0.5}$Mg$_{0.5}$)$_2$SiO$_4$ was confirmed as a result of the analysis thereof by an X-ray diffraction (XRD) method.

Example 7

A catalyst carrier and a precious metal-supporting catalyst (sample) were obtained in the same manner as in Example 2 except that Ba carbonate (BaCO$_3$) and silicon oxide (SiO$_2$) were mixed together at a proportion of 1:1 in a molar ratio instead of mixing Ca carbonate (CaCO$_3$) and silicon oxide (SiO$_2$) together at a proportion of 2:1 in a molar ratio in Example 2.

Incidentally, the catalyst carrier obtained in this manner had a specific surface area of 1.7 m$^2$/g and a peak indicating the single phase of BaSiO$_3$ was confirmed as a result of the analysis thereof by an X-ray diffraction (XRD) method.

Example 8

A catalyst carrier and a precious metal-supporting catalyst (sample) were obtained in the same manner as in Example 2 except that an aqueous solution of Pt(NH$_3$)$_2$(NO$_2$)$_2$ was changed to an aqueous solution of Pd nitrate as well as Ca carbonate (CaCO$_3$) was changed to Ba carbonate (BaCO$_3$) in Example 2.

Incidentally, the catalyst carrier obtained in this manner had a specific surface area of 3.9 m$^2$/g and a peak indicating the single phase of Ba$_2$SiO$_4$ was confirmed as a result of the analysis thereof by an X-ray diffraction (XRD) method.

<Measurement of Degree of Dispersion (%) of Pt or Pd>

The degree of dispersion (%) of Pt (Pd) was measured by a CO pulse adsorption method.

Incidentally, the degree of dispersion of Pt (Pd) presented in Table 1 and Table 2 is a value calculated by Equation (1).

Degree of dispersion of Pt (Pd) (%)=(amount of Pt (Pd) corresponding to amount of CO adsorbed (mole)/total amount of Pt (Pd) contained (mole))×100

<C$_3$H$_6$—O$_2$ Reaction (Light-Off Test)>

As a pre-treatment of the test for C$_3$H$_6$ oxidation activity evaluation test, a gas of 1.5% O$_2$/He (600° C.) was allowed to flow over 0.1 g of the precious metal-supporting catalyst (sample) at a gas flow rate of 500 cm$^3$/min for 10 minutes, thereby conducting the pre-treatment.

The purification performance of the respective precious metal-supporting catalysts (samples) obtained in Comparative Example 1 and Examples 2 to 7 by a simulated exhaust gas was evaluated by using a fixed bed flow type reactor.

In other words, 0.1 g of each of the precious metal-supporting catalysts (samples) was set in the reaction tube such that quartz wool was respectively packed in front of and behind the precious metal-supporting catalyst (sample) as well as quartz wool was respectively packed in front of and behind the catalyst so as to sandwich the catalyst.

Thereafter, a simulated exhaust gas having a composition consisting of C$_3$H$_6$ at 1500 ppm, O$_2$ at 9000 ppm, and He as the balance was introduced into the reaction tube at a total flow rate of 500 cm$^3$/min after the pre-treatment, the temperature was continuously raised from 100° C. to 600° C. at 10° C./min, and the exhaust gas at the outlet of the reaction tube was analyzed by using a quadrupole mass spectrometer to determine the component composition in the reaction gas.

<NO-C$_3$H$_6$—O$_2$ Reaction (Light-Off Test)>

As a pre-treatment of the test for NO reduction activity evaluation test, a gas of 1.5% O$_2$/He (600° C.) was allowed to flow over 0.1 g of the precious metal-supporting catalyst (sample) at a gas flow rate of 500 cm$^3$/min for 10 minutes to conduct the pre-treatment, and the temperature was lowered to the temperature at which the reaction was started.

The purification performance of the respective precious metal-supporting catalysts (samples) obtained in Comparative Example 1 and Examples 2 to 8 by a simulated exhaust gas was evaluated by using a fixed bed flow type reactor.

In other words, 0.1 g of each of the precious metal-supporting catalysts (samples) was set in the reaction tube such that quartz wool was respectively packed in front of and behind the precious metal-supporting catalyst (sample) as well as quartz wool was respectively packed in front of and behind the catalyst so as to sandwich the catalyst.

Thereafter, a simulated exhaust gas having a composition consisting of NO at 1000 ppm, C$_3$H$_6$ at 1500 ppm, O$_2$ at 9000 ppm, and He as the balance was introduced into the reaction tube at a total flow rate of 500 cm$^3$/min after the pre-treatment, the temperature was continuously raised from 200° C. to 600° C. at 10° C./min, and the exhaust gas at the outlet of the reaction tube was analyzed by using a quadrupole mass spectrometer to determine the component composition in the reaction gas.

TABLE 1

| | Compositional formula | Specific surface area (m²/g) | Degree of dispersion of Pt (Pd) (%) | $C_3H_6$—$O_2$ reaction HC T-50 | NO—$C_3H_6$—$O_2$ reaction | | | |
|---|---|---|---|---|---|---|---|---|
| | | | | | HC T-50 | T-20 (NO) | NO η 400(NO) | η 500(NO) |
| Comparative Example 1 | Pt/$Al_2O_3$ | 159.6 | 28.2 | 348 | 409 | 398 | 21 | 21 |
| Example 2 | Pt/$Ca_2SiO_4$ | 8.8 | 2.6 | 310 | 379 | 370 | 35 | 26 |
| Example 3 | Pt/$Sr_2SiO_4$ | 9.6 | 3 | 330 | 380 | 375 | 37 | 27 |
| Example 4 | Pt/$(Sr_{0.5}Ca_{0.5})_2SiO_4$ | 1.9 | 2.5 | 321 | 387 | 378 | 35 | 22 |
| Example 5 | Pt/$(Sr_{0.5}Mg_{0.5})_2SiO_4$ | 3.1 | 0.9 | 316 | 374 | 364 | 37 | 26 |
| Example 6 | Pt/$(Ca_{0.5}Mg_{0.5})_2SiO_4$ | 2.2 | 1.2 | 342 | 398 | 384 | 29 | 29 |
| Example 7 | Pt/$BaSiO_3$ | 1.7 | 3 | 329 | 391 | 390 | 29 | 26 |
| Example 8 | Pd/$Ba_2SiO_4$ | 3.9 | 1.4 | — | 361 | 367 | 21 | 7 |

Discussion

From the results for the $C_3H_6$—$O_2$ reaction (Light-off test), it was revealed that T-50 of THC is on the lower temperature side in Examples as compared to Comparative Example 1 in which alumina is the carrier, and higher low-temperature activity is exerted in Examples as compared to the alumina carrier.

In addition, from the results for the NO—$C_3H_6$—$O_2$ reaction (Light-off test), it was revealed that T-50 of THC is on the lower temperature side in Examples even in the coexistence with NO as compared to Comparative Example 1 in which alumina is the carrier, and higher low-temperature activity is exerted in Examples as compared to the alumina carrier. Furthermore, a tendency was revealed that T-20 of NO is also on the lower temperature side as T-50 of THC is on the lower temperature side.

It can be said that such a tendency is obtained in the case of phosphate particles as well.

Incidentally, the results on the low-temperature activity are superior in Examples to Comparative Example 1 although alumina used in Comparative Example 1 has a higher degree of dispersion as compared to the silicate particles used in Examples. With regard to this, it is presumed, for example, in consideration of the results for the $C_3H_6$—$O_2$ reaction, $C_3H_6$ is activated on the catalyst carrier, namely, the surface of silicate particles so that a state in which the reaction of the HC-activated species with $O_2$ or NO is likely to take place from the low temperature region is obtained and thus superior low-temperature activity is exerted in both reactions in Examples even though the specific surface area or the degree of dispersion of precious metal is significantly smaller as compared to that in Comparative Example 1.

In addition, it was found that the conversion ratio of $C_3H_6$ increases and the combustion of $C_3H_6$ is dominant in the high temperature region in Examples. Meanwhile, it was found that a higher η 500 is exhibited in Examples as compared to Comparative Example 1 although the conversion ratio of NO decreases along with an increase in temperature.

In addition, as presented in Example 8, it was possible to confirm that the present catalyst carrier can exert the propylene activating ability or oxygen activating ability as compared to the case of using an $Al_2O_3$ carrier although it has a smaller surface area in the same manner as in the case of supporting Pt even though the precious metal to be supported is a precious metal other than Pt, and the conversion ratio of NOx at a high temperature up to about 400° C. can be maintained at the equivalent level.

In addition, with regard to the active species to be supported on the present catalyst carrier, it was also confirmed that the NO conversion ability in a high temperature region is exerted in addition to the low-temperature activity by combining the present catalyst carrier with Pt or Pd rather than Rh.

It is possible to expect to obtain the same effect as in Examples described above from a carrier for exhaust gas purification catalyst composed of particles which contain a silicate containing one kind or two or more kinds among the elements belonging to Group 1 and Group 2 in the periodic table when Examples described above, the tests which have been so far carried out in the invention, and the common general technical knowledge that the elements belonging to Group 1 in the periodic table have common chemical properties and the elements belonging to Group 2 in the periodic table also have common chemical properties are taken into consideration.

Example 9

Ba carbonate ($BaCO_3$) and K dihydrogen phosphate ($KH_2PO_4$) were mixed together at a proportion of 1:1 in a molar ratio, and the mixture was introduced into ethanol, wet-mixed by stirring for 24 hours, then dried by holding for 12 hours at 60° C. (product temperature), then temporarily calcined for 3 hours at 600° C. in the air, and calcined for 3 hours at 1300° C., thereby obtaining a catalyst carrier.

The catalyst carrier obtained in this manner had a specific surface area of 1.0 m²/g and a peak indicating the single phase of $KBaPO_4$ was confirmed as a result of the analysis thereof by an X-ray diffraction (XRD) method.

A precious metal-supporting powder using the catalyst carrier described above was obtained by the same procedure as in Example 2.

Example 10

Sr carbonate ($SrCO_3$) and K dihydrogen phosphate ($KH_2PO_4$) were mixed together at a proportion of 1:1 in a molar ratio, and the mixture was introduced into ethanol, wet-mixed by stirring for 24 hours, then dried by holding for 12 hours at 60° C. (product temperature), and then calcined for 12 hours at 1200° C. in the air, thereby obtaining a catalyst carrier.

The catalyst carrier obtained in this manner had a specific surface area of 0.9 m²/g and a peak indicating the single phase of $KSrPO_4$ was confirmed as a result of the analysis thereof by an X-ray diffraction (XRD) method.

A precious metal-supporting powder using the catalyst carrier described above was obtained by the same procedure as in Example 2.

Example 11

Ba acetate ($Ba(CH_3COO)_2$) and Na dihydrogen phosphate ($NaH_2PO_4 \cdot 2H_2O$) were mixed at a proportion of 1.5:1 in a molar ratio, and the mixture was introduced into nitric acid, subsequently the pH thereof was adjusted to 13 with Na hydroxide, the resultant mixture was aged for 12 hours at 90° C., and the suspension thus obtained was filtered, the residue was then dried for 12 hours at 60° C., thereby obtaining a catalyst carrier.

The catalyst carrier obtained in this manner had a specific surface area of 3.0 m²/g and a peak indicating the single phase of $Ba_{1.5}PO_4$ was confirmed as a result of the analysis thereof by an X-ray diffraction (XRD) method.

A precious metal-supporting powder using the catalyst carrier described above was obtained by the same procedure as in Example 2.

<Measurement of Specific Surface Area and Degree of Dispersion of Pt>

The specific surface area (m²/g) and the degree of dispersion (%) of Pt were measured in the same manner as described above.

<$C_3H_6$—$O_2$ Reaction (Light-Off Test)>

The $C_3H_6$—$O_2$ reaction (Light-off test) was measured in the same manner as described above.

TABLE 2

| | Compositional formula | Specific surface area (m²/g) | Degree of dispersion of Pt (%) | $C_3H_6$—$O_2$ reaction HC T-50 |
|---|---|---|---|---|
| Example 1 | Pt/$Ba_2SiO_4$ | 0.4 | 2 | 280 |
| Example 9 | Pt/$KBaPO_4$ | 1.0 | N.D. | 260 |
| Example 10 | Pt/$KSrPO_4$ | 0.9 | 2 | 227 |
| Example 11 | Pt/$Ba_{1.5}PO_4$ | 3.0 | 7 | 220 |

It has been confirmed that a carrier for exhaust gas purification catalyst composed of particles which contain a phosphate containing one kind or two or more kinds among the elements belonging to Group 1 and Group 2 in the periodic table has the same mechanism of action and can have the same effect as a carrier for exhaust gas purification catalyst composed of particles which contain a silicate containing one kind or two or more kinds among the elements belonging to Group 1 and Group 2 in the periodic table when Examples 9 to 11 and the results of the tests which the present inventors have so far carried out are taken into consideration.

The invention claimed is:

1. A carrier for exhaust gas purification catalyst comprising particles containing a silicate containing one kind or two or more kinds among elements belonging to Group 1 and Group 2 in the periodic table,
   wherein the silicate is $A_2SiO_4$ (A is an element including Sr or Ba or these two kinds), $ASiO_3$ (A is an element including Sr or Ba or these two kinds), or a mixture of these.

2. The carrier for exhaust gas purification catalyst according to claim 1, wherein the silicate is a silicate containing Ba.

3. An exhaust gas purification catalyst comprising the carrier for exhaust gas purification catalyst according to claim 2 and a catalytically active component.

4. An exhaust gas purification catalyst comprising the carrier for exhaust gas purification catalyst according to claim 1 and a catalytically active component.

5. A carrier for exhaust gas purification catalyst comprising particles containing a phosphate containing one kind or two or more kinds among elements belonging to Group 1 and Group 2 in the periodic table,
   wherein the phosphate is $A_xPO_4$ (x=2 or 1.5, A in the case of x=2 is a combination of any one kind of monovalent element or two or more kinds of monovalent elements among Li, Na, K, and Cs with any one kind of divalent element or two or more kinds of divalent elements among Mg, Ca, Sr, and Ba, A in the case of x=1.5 is two or more kinds of divalent elements among Mg, Ca, Sr, and Ba or divalent element comprising Sr).

6. The carrier for exhaust gas purification catalyst according to claim 5, wherein the phosphate is a phosphate containing Ba.

7. An exhaust gas purification catalyst comprising the carrier for exhaust gas purification catalyst according to claim 5 and a catalytically active component.

\* \* \* \* \*